March 19, 1935.  P. D. MERRILL  1,994,527
PIPE JOINT SEALING MEANS
Filed Dec. 17, 1931
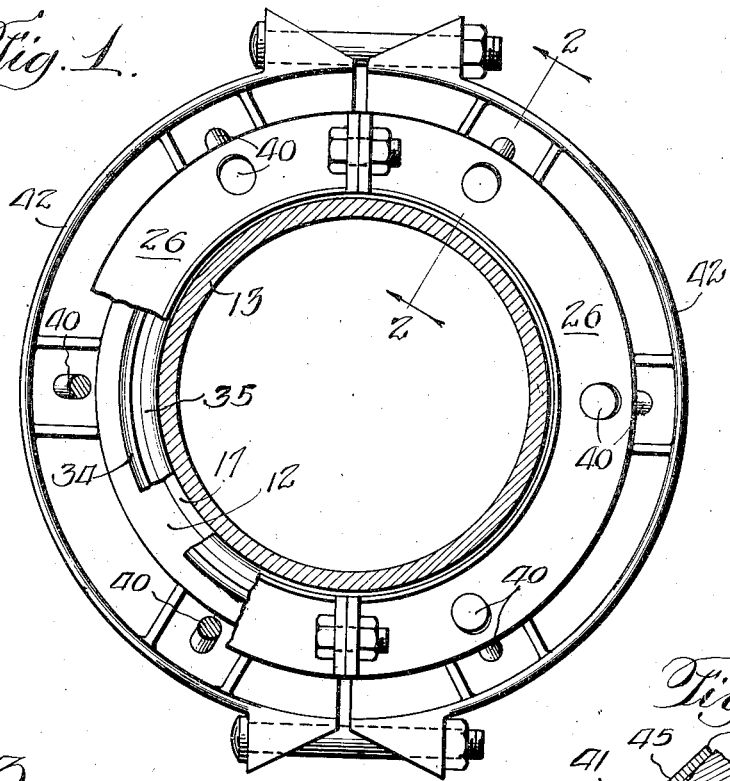
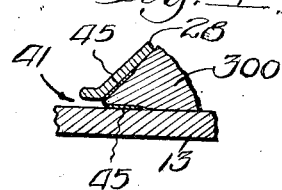
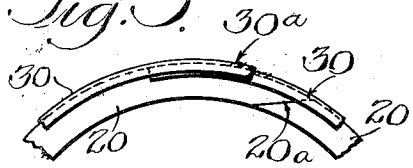
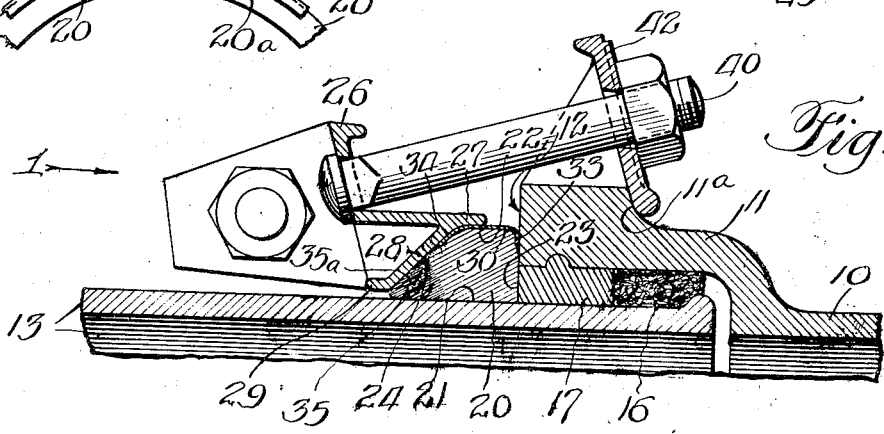
Inventor
Patterson D. Merrill
By Luther Johns
Atty.

Patented Mar. 19, 1935

1,994,527

UNITED STATES PATENT OFFICE 1,994,527

PIPE JOINT SEALING MEANS

Patterson D. Merrill, South Bend, Ind., assignor to M. B. Skinner Co., South Bend, Ind., a corporation of Indiana Application December 17, 1931, Serial No. 581,593

6 Claims. (Cl. 285—119)

REISSUED

This invention relates to devices for sealing the joints of pipes to prevent leakage. It is designed especially for use in connection with pipes of the "bell and spigot" type in which the enlarged end or "bell" of one pipe accommodates the "spigot" end portion of the adjacent pipe, with packing between the overlapped and interfitting portions of the pipes.

The prime object is to provide highly efficient, readily applicable and readily operable means for stopping leaks at such and similar joints.

In the past, so far as I am aware, the efficiency of devices of this general class has depended largely upon the inherent resiliency of the gasket or packing, usually of rubber compound. In all such devices that I am aware of there has been some avenue of escape or extrusion for the elastic packing under compression. In older forms, so long as the packing resists such extrusion by its inherent tenacity the joint remains satisfactorily sealed, but in time the packing deteriorates whereby the sealing force of the packing is lost. One of the peculiar phenomena of a construction wherein the rubber is permitted to extrude is that where the extrusion takes place the rubber disintegrates very rapidly owing to the strain in which the material is placed by the extrusion itself. Briefly stated, rubber under stretch rots rapidly. The result is that disintegration begins at these areas of extrusion and works inward and throughout the mass.

My present invention is directed chiefly to the overcoming of these disadvantages, and to provide thereto a device according to which the desired compression may be had upon the gasket while maintaining it free of extrusion.

According to one feature of the present invention I provide an annular ring of strong, thin and flexible sheet material which encompasses the outer surface of the gasket where it would otherwise be exposed. This much of the idea may not be broadly new, but in connection therewith I provide the ring with a flange-like rear portion of substantially truncated-cone shape which fits upon the similarly-shaped rear surface of the gasket, and the follower or compression member has a similarly-shaped compression surface bearing thereagainst, while it has an outer annular surface telescopically encompassing portions of the outer surface of the flexible ring. According to this construction the follower or compression member may be advanced longitudinally of the pipe while the exposed portion of the flexible ring remains in its desired covering relation to the gasket, and the inner or flange-like part of the ring is caused to reshape itself on advancing annular lines so that its rear edge creeps downward over the gasket, and thus a thorough and effective seal is maintained for the gasket at the outer surfaces thereof.

The second more specific feature of the invention is the provision of means for avoiding extrusion at the necessarily loose joint between the compression member and the pipe which it surrounds; and to this end I preferably provide the gasket with a relatively hard portion in the corner or space between the pipe and the slanting surface of the follower, this relatively hard portion serving substantially as a plug and preventing extrusion at that annular area.

In the drawing Figure 1 is a face view of the device on a pipe sectionally shown and being viewed in the direction of the arrow 1 in Fig. 1, parts being broken away to show other parts beyond; Fig. 2 is an enlarged longitudinal section, as on the line 2—2 of Fig. 1 showing the device mounted on the interconnected pipe sections; Fig. 3 is a fragmentary face view of the retaining ring at its overlapping joint; and Fig. 4 is a fragmentary section showing a modification of one feature, the other features to be understood as being as otherwise shown.

The pipe section 10 has a bell or enlargement 11 having an end wall 12 constituting a shoulder relative to pipe 13 interfitting with the bell of pipe 10. In the annular space between pipes 10 and 13 there is packing material such as hemp or oakum 16 against which is poured hot lead to provide the seal 17, and this is old and well known in bell-and-spigot pipe joint construction. The joint to be sealed is at the lead filler 17.

Fitting against pipe 13 and also against the shoulder 12 and filler 17 is a gasket 20, which is an annular member understood as being split, as on diagonal lines, for ready application around the pipe as 13, as at 20a of Fig. 3. It has an inner surface 21, an outer surface 22, a forward or front surface 23, and a rear surface 24, thus having the shape of a four-sided polygon in cross view. Surfaces 21, 22 and 23 are suitably at right angles to each other, while surface 24 has substantially the shape of a truncated cone, the slant of which is inward and rearward.

The annular follower or compression member 26 has an annular part 27 which telescopically overlies the outer surface 22 to some extent, and has also an annular compression part 28 which has substantially the same shape as the surface 24, and fits upon that surface.

Surrounding the gasket is a ring 30 of thin, flexible and strong sheet material. Part 27 of the follower closely overlies part of this ring for sliding movement thereover. Ring 30 is fragmentarily shown in Fig. 3. It has its ends in overlapping relation as shown at 30a, which loose overlap permits the ring readily to be put in position around the pipe and upon the gasket, and it also permits a certain desirable play when the ring is subsequently reshaped under the compression strains.

The front end of ring 30 is turned inward as an annular flange 33 and this turned-over end contacts the shoulder 12 of pipe 10. The rear portion of ring 30 is of flange-like shape at 34 and conforms in general to the truncated cone shape of the rear wall of the gasket and of the front wall 28 of the compression member.

The gasket 20 has its rear portion 35, being preferably a limited portion of the material between pipe 13 and the slanting surface of the compression member, formed of relatively hard material, meaning hard relative to that of the rest of the gasket. The main body of the gasket is of relatively soft material. As a matter of importance, I am able to use for the main body of the gasket materially softer rubber compound than has been deemed feasible heretofore, thus gaining the advantage of a much better sealing effect. The part 35 (nose-like in cross view) is integral with the rest of the gasket, and the difference in hardness between the two portions is due to the degree of vulcanization which is given the portions respectively. Thus the annular part 35 may be vulcanized for a longer period than is the main body of the gasket, or its composition may be such that it will vulcanize to a greater extent in the same length of time given to the vulcanization of the main body. In my practice the main body is substantially soft, while part 35, although not reaching to the degree which is ordinarily called hard rubber is, nevertheless, quite hard relative to the main body. It is soft enough to shape itself to the surfaces contacted, under the pressure, but is too hard to extrude.

Means for drawing the follower or compression member 26 in the direction of shoulder 12 comprise a plurality of bolts 40 engaging the compression member at spaced-apart intervals as shown in Fig. 1, with nuts drawing the follower toward a ring 42 seated against the bell 11 at 11a. The construction of the follower in some of its features, with bolts 40 and the ring 42, is shown in my copending application Serial No. 496,838, filed Nov. 20, 1930 on Pipe Joint sealing devices. So far as the present invention is concerned any appropriate means for moving the follower or compression member may be used. What I regard as the essence of the present invention is in the gasket and the devices immediately associated therewith, and in the combination thereof with any suitable means for developing the desired strains for sealing effects.

Turning now to the operations and results, it will be observed that when tightening strains are brought to bear on the compression member 26 through the bolts 40 that compression member as a whole is moved toward the shoulder 12 and the flexible ring 30 is maintained tightly, at 33, against shoulder 12, while the rear flange-like part 34 is progressively reformed as the follower creeps over and upon it, to such effect that the lower edge of this flange-like part 34 moves or creeps downward upon the slanting rear surface of the gasket. It will be noted that according to this construction the gasket is completely maintained encompassed and encased at its outer surfaces, with no possibility of gasket-extrusion either at the front, top or rear of this flexible ring. The shape of the ring is such that it withstands all the pressure properly brought to bear upon the gasket, and it will be observed too that since the ring has an inturned flange 33 this front edge portion of the ring is greatly strengthened to withstand circularly-directed tensile strains in it.

It will be noted, and this is an important feature of the invention, that the compression member 26 does not abut the gasket 20 in a plane perpendicular to the line of pull of the bolts 40 as in common in prior art structures, but on the contrary, the sloping abutment between the inclined surface 24 of the gasket 20 and the inclined surface 28 of the compression member produces a wedging or cam effect upon the gasket which forces the gasket in a direction perpendicular to the pipe 13 and therefore into tight abutment with this pipe. In prior art structures where there is a perpendicular abutment between the compression member and the gasket, the gasket tends to be forced either away from the pipe or merely parallel to it, which does not produce my important wedging action. This wedging action of my structure just disclosed results in an adjustability of the gasket and the compression member to variations in diameter or surface of the pipe and produces an improved seal not heretofore obtainable.

The relatively hard gasket part marked 35 acts in the nature of a plug to seal the gap which occurs between the compression member part 29 and the outer surface of pipe 13. These sealing devices are not made to fit closely upon the usual gas mains and pipes of that general type, owing to various irregularities in the pipe, and this place between the pipe as 13 and the part as 29 or the corresponding place in other constructions, has always been a source of pronounced extrusion.

The material 35 may not extrude, owing to its hardness, and, since it is homogeneously united with the body of the gasket it acts to stop the opening while permitting the softer portions of the gasket to fit tightly against the adjacent pipe on one side and the slanting wall 28 on the other side. It is only necessary to have this hardened part 35 extend inward from the rear end a comparatively short distance, for example as shown in the drawing, and it is preferable not to have it extend very far since thereby the compression of the softer and better-sealing rubber against the adjacent walls would be more limited.

The portion 35 may be reinforced if desired. I have shown at 35a some fibrous material serving as a bond.

In Fig. 4 I have shown an annular trough-shaped seal 45 of lead or similar soft sheet material to serve as a dam for the gasket at the opening 41. In this case the gasket 300 may be of soft material throughout.

According to the present invention I attain, and I believe for the first time, a perfect sealing of the leaking joint while maintaining the gasket not only substantially free of the corroding influences which attack it, especially when buried under ground as is usually the case, but I provide a construction according to which I do not depend upon the inherent elasticity of the rubber to maintain the seal. Consequently the present seal will last indefinitely in service whereas otherwise in a few years at the outside the seal would be expected to require attention, with the opening up of the earth, replacement of gaskets, etc., or at least a retightening of the clamping elements.

The reason I do not depend upon the elasticity of the rubber is that the rubber gasket is substantially a fluid body upon which pressure is applied, and it is actually the applied pressure of the bolts which creates the sealing pressure. This pressure continues regardless of the elasticity of the rubber. The elasticity is desired for the creeping effects of the rubber into the interstices of the leaky joint, but the effectiveness of the seal does not depend upon the continued elasticity of the material. To illustrate my meaning, a plastic material like putty or a similar compound confined as my gasket is confined would creep into the interstices and seal the joint, and the pressure upon it by the bolts would maintain the seal although the material has no inherent resiliency.

There are well-known laboratory instruments called plastometers for determining the degree of internal mobility or fluidity of substance of various kinds, including rubber, in mass form, and such instruments give standard readings according to which manufacturers of say rubber-compound devices may supply the product in any appropriate degree of density, meaning softness or hardness, specified by the user in terms of the standard plastometer scale. Hereinabove I have described my novel gasket as being of "materially softer rubber compound than has been deemed feasible heretofore," and as being "substantially soft," and as "substantially a fluid body," and have illustrated the operative character of the material by a comparison with "putty or similar compound." A gasket material having these characteristics and properties will have a standard plastometer reading of about 1. to about 1.75, the latter figure denoting the higher degree of softness or fluidity of the material.

In this connection I may mention that since rubber compound has a tendency to swell in the presence of solvents, according to this construction, should solvents in small quantities find their way into the presence of the rubber and induce some swelling thereof, such enlargement would have only the tendency to increase the sealing effect; whereas according to the older constructions such swelling induces extrusion, and the extrusion causes more deterioration, with still further extrusion, so that the tendency has been for enough of the gasket to escape to call for its replacement.

I contemplate as being included in these improvements all such variations, changes and departures from what is specifically illustrated and described herein as fall within the scope of the appended claims.

I claim:

1. A device for sealing the annular joint between interconnected tubular members providing an annular shoulder near the joint to be sealed, comprising an annular gasket fitting upon both of said members at said joint, said gasket having outer and inner surfaces and front and rear surfaces in cross view, a substantially non-expansible thin and flexible retaining ring having an outer portion fitting circumferentially closely and freely for relative movement upon the gasket on its outer surface, the rear surface of the gasket slanting rearward and inward at a materially great angle to the outer surface thereof, the retaining ring having an integral rear flange-like portion fitting upon said slanting rear surface of the gasket and merging on rounded lines into said outer portion of the retaining ring, and gasket-compressing means closely encompassing telescopically said retaining ring on its outer surface, extending circumferentially along and bearing annularly against the rear surface of said ring, the front edge portion of the retaining ring being adapted to abut such annular shoulder, with means for moving said gasket-compressing means toward such shoulder to force the gasket into the joint to be sealed while providing that the rear portion of the retaining ring may adjust itself automatically by creeping rearward and inward on and relative to said slanting surface of the gasket.

2. Pipe joint sealing means comprising in cross-section a relatively soft rubber body in immediate abutment with the line of union between the spigot and bell end portions of a pair of pipes, said body being of a degree of softness permitting it to flow into said joint under pressure and having an inclined outer face; a rigid compression member having a similarly inclined face in slidable abutment with the inclined face of the body; flexible substantially non-expansible confining means of relatively harder material than the body, disposed to abut and seal the spaces between the compression member and the bell and spigot end portions respectively at each end of said incline; and means for applying pressure through said compression member on said body and confining means whereby the cross-sectional area of the body is reduced and the compression member tends to slide as a cam on the body and confining means to force the body and confining means inwardly and the body tends to flow into the joint but is under compression at every other point to prevent extrusion.

3. The structure of claim 2 wherein the confining means abutting the spigot portion is in the form of a rubber tip nose-like in cross-section, integral with the body but of relatively harder rubber.

4. The structure of claim 2 wherein the confining means abutting the bell portion is in the form of a substantially nonexpansible thin and flexible metallic band fitting closely on the body and partially telescoped within the compression member, said band having a rearwardly inclined portion which is slidably lapped by the inclined portion of the compression member.

5. The structure of claim 2 wherein the confining means abutting the bell portion is in the form of a substantially nonexpansible thin and flexible metallic band fitting closely on the body and partially telescoped within the compression member and wherein the compression member has a forwardly extending portion disposed at an angle to its inclined face and lapping the band and wherein the band is turned inwardly between the body and the bell portion.

6. The structure of claim 2 wherein said body is of a density denoted by a standard plastometer reading of between 1. and 1.75.

PATTERSON D. MERRILL.